Aug. 13, 1968 W. C. VAYDA 3,396,919

MAGNETIC BOBBIN HOLDING DEVICE

Filed March 1, 1966

INVENTOR
WILLIAM C. VAYDA
BY Sandoe, Neill, Schottler & Wikstrom
ATTORNEYS.

United States Patent Office 3,396,919
Patented Aug. 13, 1968

3,396,919

MAGNETIC BOBBIN HOLDING DEVICE

William C. Vayda, Bayonne, N.J., assignor to General Cable Corporation, New York, N.Y., a corporation of New Jersey Filed Mar. 1, 1966, Ser. No. 530,988
8 Claims. (Cl. 242—129.7)

ABSTRACT OF THE DISCLOSURE

A spindle assembly for supporting a reel of wire or like material including a plurality of spaced magnetic coupling elements for drivingly securing the reel on the spindle. The magnetic coupling elements are mounted to permit limited angular movement for proper alignment with the associated reel.

This invention relates to apparatus for holding and driving a bobbin mounted on a spindle. It is intended for use on wire payoff apparatus and take-up stands where there are a multiple of spindles for holding large and heavy reels of wire for a cable stranding machine, but the invention is not limited to such use.

The speed at which operations can be performed on wires when using stranding apparatus, depends to a large extent on the ease of loading and unloading the reels into their spindle positions. The loading time will be seen to be substantial when it is realized that hundreds of reels may be placed into position at a common setting for the process operation such as in telephone unit construction. It follows that cutting down this loading time results in a greater efficiency of operation.

It is an object of the invention to provide improved means for holding a reel on a reel spindle and for preventing the displacement of the reel from the end of the spindle over which the reel is loaded on the spindle. Displacement of the reel in the opposite direction is prevented by a flange or shoulder which is permanently in place.

It is a particular object of the invention to provide improved means of driving a bobbin with little or no slip, with reference to the reel spindle.

Still another object is to provide a simple construction whereby the bobbin, when necessary, can be removed from the reel spindle without having to manually unlock an actuated device.

Other objects, features and advantages of the invention will appear, or be pointed out, as the description proceeds.

In the drawing, forming a part hereof, in which like reference characters indicate corresponding parts in all the views.

Figures 1, 2, 3:
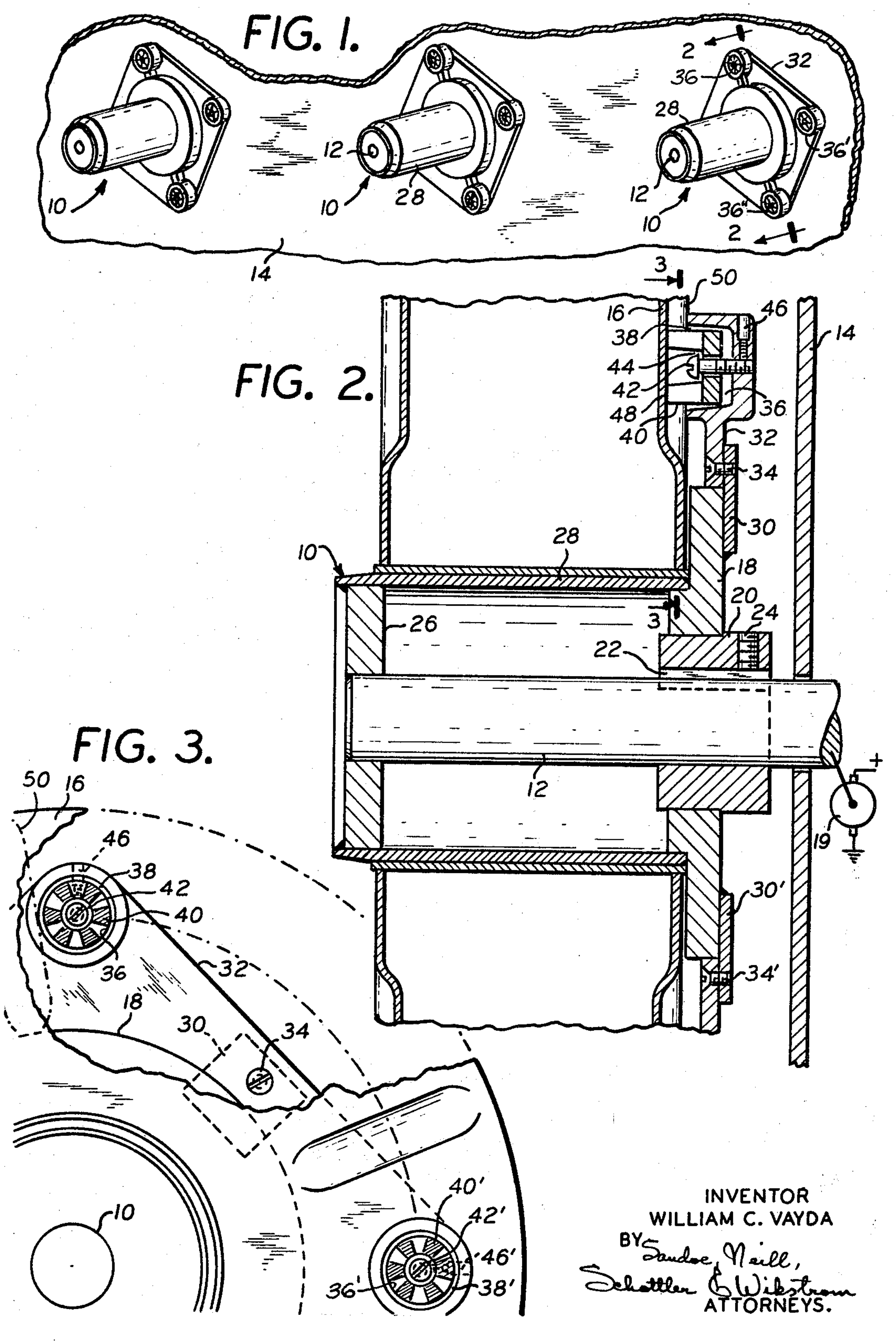
FIGURE 1 is a perspective view showing one of the spindles on a wire pay-off apparatus with the spindle reel holding and driving device of this invention.
FIGURE 2 is a greatly enlarged sectional view taken through a diameter of the spindle shown in FIGURE 1 and on the section plane indicated by the line 2—2.
FIGURE 3 is a view on the line 3—3 of FIGURE 2.

The drawing shows a spindle 10 supported by a shaft 12 from a frame 14 of a wire pay-off apparatus. There are a multiple of such spindles extending from the frame 14 in accordance with conventional practice and as explained above. FIGURE 2 shows a reel 16 on the spindle 10. A flange 18 at the rearward end of the spindle 10 serves as an abutment for limiting axial movement of the reel 16 toward the frame 14 .

The shaft 12 is driven by power means 19, in accordance with conventional construction, and the spindle 10 is connected to the shaft 12 by a hub 20 of the flange 18 having a key 22 and multiple set screws 24.

Toward the forward end of the spindle 10 there is an inwardly projecting flange 26 which fits over the shaft 12. Thus the hub 20 and flange 26 provide the bearing supports of the spindle 10 from the shaft 12.

The portion of the spindle 10 on which the reel 16 rests is a cylindrical shell 28; and this shell 28 extends beyond the flange 26 and beyond the end of the shaft 12.

There is a flat clip or support 30 extending from the flange 18 in a direction perpendicular to the axis of the shaft 12. This support 30 is secured to the flange 18 by welding to the flange 18 near the outside periphery of the flange 18.

A housing 32 of non-ferrous material fits against the upper surface of the support 30 and around the flange 18 and is secured to the support 30 by means of holding screws 34. There is a compartment 36 within the housing 32 extending through the horizontal length of the housing 32. This compartment serves as part of a holder for the magnet located in it. At the outward end of the housing 32, nearest the reel 16, there is a circular opening or port 38.

A magnet 40 of sufficient magnetic flux is confined within the compartment 36 of the housing 32 with the poles of the magnet 40 protruding through the port 38 of the outward end of the housing 32 nearest the reel 16.

The magnet 40 is positioned and held within the compartment 36 by means of a holding screw 42 passing through a hole 44 located at the back of the magnet 40 and on the center line axis of the magnet 40 and into a tapped hole in the housing 32 on the center line axis of the compartment 36.

The holding screw 42 of non-ferrous material confining the magnet 40 in the compartment 36 of the housing 32 is prevented from being released from the tapped hole in the housing 32 by means of a small set screw 46 of non-ferrous material passing through a tapped hole in the housing 32 perpendicular to and over the tapped hole located on the center line axis at the back end of the compartment 36.

The dimensions of the circular port 38 in the compartment 36, together with the dimensions of the holding screw 42 passing through the hole 44 of the magnet 40, are such as to allow movement of the magnet 40 in any plane, forward towards the reel 16 or backward from the reel 16. The magnet 40, although confined in the compartment 36 has sufficient clearance, allowing the magnet 40 to move in an angular position to seat the magnet poles 48 normal to the magnet 40 holding fluxes.

Located on the housing 32, are positioned a multiple of compartments 36 located at equi-angular points and equi-distant from the center line of the spindle 10 and diametrically opposite to each other; these compartments 36′ are associated with the housing 32 in the same way as the compartment 36 is associated with the housing 32, corresponding parts being indicated by the same reference character as for the compartment 36, but with a prime, double prime, and triple prime appended.

The magnetic flux of the magnets 40 in contact with the reel side surface holds the reel 16 from movement to the outside end of the spindle 10.

The magnets 40 grip the side of the reel 16 with sufficient force to rotate the reel as a unit with the spindle 10 under ordinary conditions. If, at any time, the magnetic force is not sufficient to rotate the reel without slippage, only a limited slip occurs because each reel 16 has re-inforcing ribs 50 at angularly spaced locations around its axis, and slippage of the magnet 44 on the reel 16 brings the nearest re-inforcing rib 50 into position to contact with the end of the housing 32. The end of the housing thus provides a shoulder which contacts with the re-inforcing rib 50 to rotate the reel 16 when the magnetic attraction is insufficient to rotate the reel without slippage. In placing each reel on its spindle shell 28, the reel is always placed in an axial position which initially locates the re-inforcing ribs 50 beyond the ends of the housing 32 so that the reel can abut against the flange 18. This brings the magnets into contact with the areas of the reel which are between successive re-inforcing ribs 50.

When a reel is to be removed from the spindle, a force is applied to the reel perpendicular to the magnetic field and in a direction outward from the flange 18 on the spindle 10. Thus the construction provides means of removal and replacement of reels without any further operation of any kind. This makes removal and replacement of reels on spindles convenient and extension time is saved because of the substantially instantaneous holding and releasing of the reels by the magnets.

The preferred embodiment of the invention has been illustrated and described, but changes and modifications can be made and some features can be used in different combinations without departing from the invention as defined in the claims.

What is claimed is:

1. In apparatus having a spindle assembly with a spindle that extends into a hub of a reel for holding wire, an abutment on the spindle for limiting rearward movement of the reel on the spindle, a frame carried by the spindle assembly and connected thereto, a magnet carried by the frame, and a mechanical connection between the magnet and the frame, said connection including means for limiting movement of the magnet parallel to the axis of the spindle, and said connection having universal movement by which the magnet can swing into angular relation with respect to the frame to bring the magnet into position to grip a rearward face of the reel, including a face that has been bent out of parallelism with the flange, when said reel is in substantial contact with the abutment.

2. The apparatus described in claim 1 characterized by the abutment being a flange surrounding the spindle near the rearward end thereof, the frame that carries the magnet being spaced radially outward from the flange and including mounting supports by which it is connected with the flange of the spindle assembly.

3. The apparatus described in claim 2 characterized by there being a plurality of angularly spaced magnets around the spindle assembly, a frame for holding each magnet, each of the magnets being a side pole magnet with a plurality of poles extending forward beyond the frame, each of the magnets having a mechanical connection to the frame including, a holding screw located on the axis of the magnet but rearward of the poles, the screw having its opposite end extending beyond the magnet and into holes in the frame, the holding screw and hole in the magnet having dimensions allowing for the angular movement of the magnet in a plane to obtain the universal movement, and the connections of the magnet to the frame having play parallel to the axis of the spindle, each of said holding screws having a forward end that limits movement of its magnet in a forward direction.

4. In apparatus having a spindle assembly with a spindle that extends into a hub of a reel for holding wire, an abutment on the spindle for limiting rearward movement of the reel on the spindle, a frame carried by the spindle assembly and connected thereto, a magnet carried by the frame with the poles of the magnet in position to contact with a rearward face of the reel when said reel is in substantial contact with the abutment, and connecting means connecting the magnet with the frame and providing limited angular movement for the magnet for alignment of the magnet with the reel on the spindle, characterized by driving means for rotating the spindle assembly, a reel on the spindle assembly with shoulders on a rearward face of the reel projecting therefrom and having radial components of extent, the reel shoulders being angularly spaced from one another around the axis of the reel, and the reel shoulders, when the reel is in contact with the magnets, extending rearward of angularly spaced parts of structure that rotates with the spindle assembly whereby said shoulders provide a positive drive for the reel if the grip of the magnets is insufficient to transmit the driving force for rotating the reel.

5. The apparatus described in claim 4 characterized by the shoulders of the reel being radially extending re-inforcing ribs on the rearward face of the reel.

6. The apparatus described in claim 4 characterized by the shoulders extending rearwardly beyond the forward ends of the frames that carry the magnets, and the sides of said frames being the structure that contacts with the shoulders to rotate the reel when the grip of the magnets is insufficient to transmit the driving torque for rotating the reel.

7. In apparatus having a spindle assembly with a spindle that extends into a hub of a reel for holding wire, an abutment on the spindle for limiting rearward movement of the reel on the spindle, a frame carried by the spindle assembly and connected thereto, a magnet carried by the frame with the poles of the magnet in position to contact with a rearward face of the reel when said reel is in substantial contact with the abutment and connecting means connecting the magnet with the frame and providing limited angular movement for the magnet for alignment of the magnet with the reel on the spindle, characterized by said apparatus having a plurality of spindle assemblies on which the reels are shipped to provide additional wire for stranding or other operations requiring large movements of wires and corresponding number of reels, reels on the different spindles freely movable axially on the spindles except for the restraining forces of the magnets, there being a plurality of angularly spaced magnets around each spindle assembly, and the magnets being of such strength that a reel can be pulled off the spindle manually against the force of said magnets.

8. The apparatus described in claim 7 characterized by the magnets being permanent side pole magnets, and each spindle assembly having a forwardly extending portion in position to axially overlap a rearwardly extending part of its reel to transmit rotation of the spindle assembly to the reel as the magnets slip laterally on the surface of the reel with which said magnets contact to hold the reel on the spindle assembly.

References Cited

UNITED STATES PATENTS 2,746,691 5/1956 Hoad ______________ 242—55

LEONARD D. CHRISTIAN, *Primary Examiner.*